(12) United States Patent
El Houmaidi (10) Patent No.: US 7,659,640 B1
(45) Date of Patent: Feb. 9, 2010

(54) POWER OVER NETWORK METHODS AND SYSTEMS

(75) Inventor: Mounire El Houmaidi, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 450 days.

(21) Appl. No.: 11/675,027

(22) Filed: Feb. 14, 2007

(51) Int. Cl.
*H02J 9/00* (2006.01)

(52) U.S. Cl. .................................................. 307/64
(58) Field of Classification Search .................. 307/64
See application file for complete search history.

(56) References Cited

U.S. PATENT DOCUMENTS 7,478,251 B1 * 1/2009 Diab et al. ................... 713/300

* cited by examiner

*Primary Examiner*—Fritz M Fleming
*Assistant Examiner*—Dru M Parries
(74) *Attorney, Agent, or Firm*—Thomas, Kayden, Horstemeyer & Risley, LLP (57) ABSTRACT

Methods and systems for providing electrical power over a network configured to facilitate digital communications are described herein. In different aspects, the methods and systems may include a service provider network module configured to facilitate digital communications and having an autonomous power supply, and a network connection device operably connected to the service provider network module. The network connection device may include at least one network connection port configured to receive electrical power; and a power switching module coupled to the at least one network connection port and configured to switch from a primary power source to enable the network connection device to receive electrical power from the service provider network module via the at least one network connection port when electrical power from the primary power source is interrupted.

17 Claims, 6 Drawing Sheets

POWER OVER NETWORK METHODS AND SYSTEMS

FIELD OF THE DISCLOSURE

The present disclosure relates to networking methods and systems, and more specifically to methods and systems for providing electrical power over a network.

BACKGROUND

A power outage typically results from an interruption to an electrical power supply. Power outages may have varying durations spanning from a few seconds to many days. In some geographic regions, power outages may occur relatively frequently, such as monthly. Even in developed cities with substantial infrastructure, power outages may frequently occur for a number of reasons, such as natural causes (e.g., wind storms, heavy rain or snow, etc.) or high demand on the electrical power supply (e.g., air conditioners used during high temperatures which drain the electrical power supply). The operation of many alternating current (AC) electrical devices may be disrupted when a power outage occurs despite the existence of precautionary measures.

When an electrical power supply is disrupted, a number of undesirable events may occur. For example, when some people lose power, they may also lose unsaved data on their computer or other electronic devices. Additionally, some people may experience a deactivation of their home security system when their electrical power supply is interrupted. The loss of data and the deactivation of electronic equipment may adversely affect a person in many ways such as by costing them time, money, and even personal safety. Further, many people typically contact their electrical power supplier to report a power outage. A flow of calls to report a power outage may create an additional drain on system resources, require redundant activities, and may slow communications for reporting a power outage.

Some people may use uninterrupted power supply (UPS) devices to minimize some of the adverse affects experienced during a power outage. However, UPS devices may be expensive, have limited power supply capacity, or may be unreliable. Connecting a UPS device to all of a person's essential electronic devices may also be difficult or expensive.

The description below addresses these and other shortcomings in the present art.

SUMMARY

Methods and systems for providing power over a network are described herein. In different aspects, the methods and systems may include a service provider network module configured to facilitate digital communications and having an autonomous power supply, and a network connection device operably connected to the service provider network module. The network connection device may include at least one network connection port configured to receive electrical power and a power switching module coupled to the at least one network connection port. According to exemplary embodiments, the power switching module of the network connection device is configured to switch from a primary power source to enable the network connection device to receive electrical power from the service provider network module via the at least one network connection port when electrical power from the primary power source is interrupted.

Additional methods for providing power over networks are described herein. In some embodiments, the methods and systems may include providing a network access point, monitoring a primary electrical power provided by a primary power source to a network device coupled to the network access point, when an interruption of the primary electrical power is detected, switching to a secondary electrical power via the network access point to the network device, when a reconnection of the primary power source is detected, decoupling the secondary electrical power from the network access point, and restoring the primary electrical power from the primary power source to the network device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTIONS OF THE DRAWINGS

The teachings herein are described with reference to the accompanying figures.

DETAILED DESCRIPTION

Network providers are capable of offering a number of services to their network subscribers, including their residential, educational, nonprofit, and business customers. Traditionally, network providers have primarily focused on providing access to computer and information networks to their subscribers through a subscription based service. However, network providers have potential to deliver additional services to their subscribers. For example, network providers may also offer their subscribers electrical power. Network providers may also measure the use of electrical power by subscribers, and thus generate additional revenue for this service by charging customers for power consumption.

Network providers may disseminate information regarding power outages or interruptions to other entities, and thus provide accurate reporting of readily obtained information. For example, an electrical power supplier may benefit from information about locations that have been disconnected from their services, including the time and status of the disconnection, in order to reconnect the locations with minimal cost and reduced downtime for the customer. Additionally, when locations are disconnected from power, the locations typically have to manually report this information to the proper entities to request reconnection of their electrical power. The manual receipt of communications from multiple customers may drain system resources from some entities and often frustrates customers. Monitoring by network providers may automatically facilitate reporting of disconnected services to the proper entities and thus may expedite reconnection of services to the affected customers.

Methods and systems for providing electrical power over a network, or "power over network" methods and systems, are described herein. Many specific details of certain embodiments are set forth in the following description and in FIGS. 1 through 6 to provide a thorough understanding of such embodiments.

Figure 1:
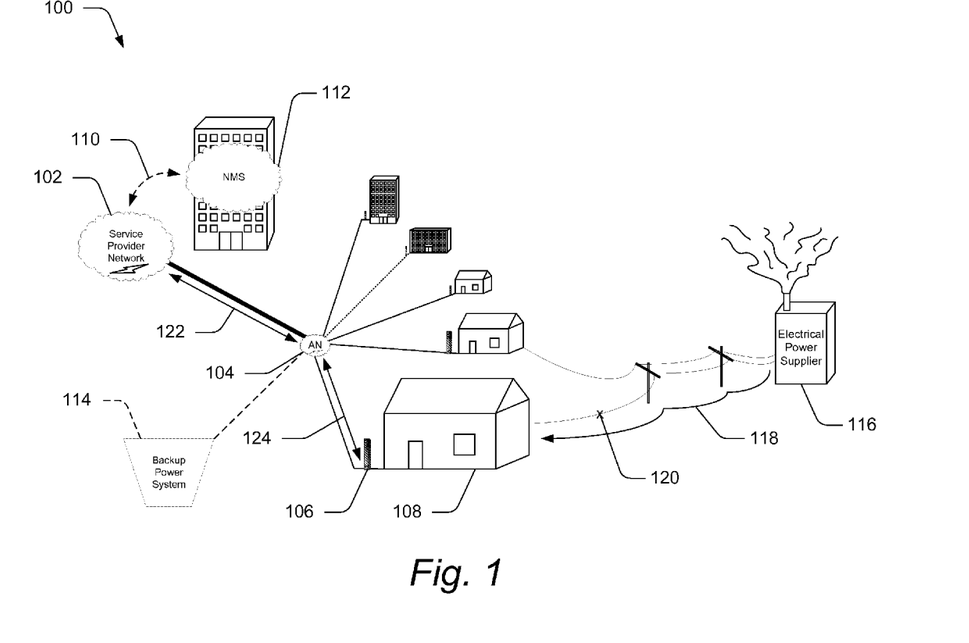
FIG. 1 is a schematic of an overall environment in which a power over network method or system may be organized.

FIG. 1 illustrates an overall environment 100 including a service provider network 102. The service provider network 102 may include an access node 104 in connection to a network connection device 106 located at a customer premise 108. In some configurations, the service provider network 102 may include multiple access nodes 104, each including multiple network connection devices 106. The service provider network 102 may be in communication with the access node 104 by a Gigabyte Ethernet (GE) network, asynchronous transfer mode (ATM) network, or any other networking connection that may facilitate network communication between the service provider network 102 and the access node 104.

The service provider network 102 may include power backup systems, such as generators or backup batteries, to enable the service provider network 102 to maintain autonomous operation during a power outage. Therefore, if the access node 104 or the customer premise 108 were to experience a power outage, the service provider network 102 may provide power to the access node 104, the customer premise 108, or both. In some configurations, the service provider network 102 may be located on a different power grid than the access node 104 or the customer premise 108. Therefore, the service provider network 102 may provide power to the access node 104 and the customer premise 108 without utilizing power backup systems.

As further shown in FIG. 1, the service provider network 102 may communicate with a network management system (NMS) 112 via a communication link 110. The NMS 112 may include software, protocols, computer systems, and other elements to facilitate the communication between the service provider network 102, the access nodes 104, and the network connection device 106. For example, the NMS 112 may include a TR69 interface connection between the service provider network 102 and the network connection device 106. Additionally, the NMS 112 may include an element management system (EMS) in communication with the access node 104. The NMS 112 may communicate with the service provider network 102 and monitor the network and power usage by the customer premise 108 utilizing the resources of the service provider network 102 or the access node 104.

Similar to the service provider network 102, the access node 104 may include power backup systems, such as generators or backup batteries, to enable the access node 104 to maintain autonomous operation during a power outage. Therefore, if the customer premise 108 were to experience a power outage, the access node 104 may provide power to the customer premise 108. In some configurations, the access node may be located on a different power grid than the customer premise 108. Therefore, the access node 104 may provide power to the customer premise 108 without utilizing power backup systems or uninterrupted power supply (UPS) devices.

The access node 104 may be in connection with one or more network connection devices 106. The network connection device 106 may be a modem, receiver, or any other device that is connected to a network, such as the service provider network 102 through the access node 104. Although the access node 104 may be in communication with any number of network connection devices 106, in some embodiments the number of network connection devices 106 configured with the access node 104 may be segmented. For example, the access node 104 may be configured with between five hundred and one thousand network connection devices 106. In other embodiments, more or less network connection devices 106 may be in communication with the access node 104. Further, access nodes 104 may be regionalized or provided for specific demographics, such as providing an access node 104 for a single neighborhood. Thus, the access node 104 may service an area containing a number of customer premises 108, including any combination of residential homes, businesses, schools, government buildings, or other locations were network subscribers utilize network connection devices 106. The network connection device 106 may be situated in any location operably connected with the access node 104.

In some embodiments, a power backup system 114 of the access nodes 104 or the service provider network 102 may be configured to provide adequate backup power for a predetermined number of customer premises 108 over a duration of time. For example, if the power backup system 114 services one thousand customer premises 108 and a design specification recommends backup power for forty-eight hours, then the power backup system 114 may be selected or configured to provide the necessary power backup to service one thousand connected customers during a power outage lasting forty-eight hours.

With continued reference to FIG. 1, the customer premise 108 may include a number of network connection devices 106. Further, the customer premise 108 may include a number of network enabled components (not shown) which connect to the network connection device 106. For example, a customer premise 108 may include a personal computer that is connected to a network connection device 106 (e.g., a modem) to enable connectivity to a computer or information network through the access node 104 (and ultimately the service provider network 102). The personal computer may also be connected to an electrical supply grid via an electrical plug inserted into an electrical outlet in the customer premise 108. An electrical power supplier 116 supplies electrical power to the electrical grid, thus providing electrical power to network enabled components including the network connection devices 106.

The electrical power supplier 116 provides electrical power to the customer premise 108 in a single direction 118, and is thus unidirectional from the electrical power supplier 116 to the customer premise 108. Similarly, the communication between the electrical power supplier 116 and the customer premise 108 is unidirectional in the same direction 118. For example, if the power supply from the electrical power supplier 116 is disconnected at a disconnection location 120, the customer premise 108 will experience an interruption of their power supply. However, when such a disconnection occurs, the electrical power supplier 116 typically may not readily determine that the customer premise 108 has been disconnected. Traditionally, electric power suppliers 116 monitor power use by customer premises 108 by reading the electrical meters or gauges at the customer premise 108. Therefore, while the electrical power supplier 116 may eventually be able to determine that a power outage has occurred at the customer premise 108, this information is usually not readily or immediately available.

In contrast to unidirectional communication between the electrical power supplier 116 and the customer premise 108, the communication among the NMS 112, the service provider network 102, the access node 104, and the network connection device 106 may be multidirectional. More specifically, in some embodiments, the communication link 110 between the NMS 112 and the service provider network 102 is bidirectional, a communication link 122 between the service provider network 102 and the access node 104 is bidirectional, and a communication link 124 between the access node 104 and the network connection device 106 (and thus the customer premise 108) is bidirectional. For example, the communication links 110, 122, 124 may transmit a message to the NMS 112 when a network enabled component (not shown) in the customer premise 108 is disconnected from its primary power source, such as the electrical power supplier 116.

Figure 2:
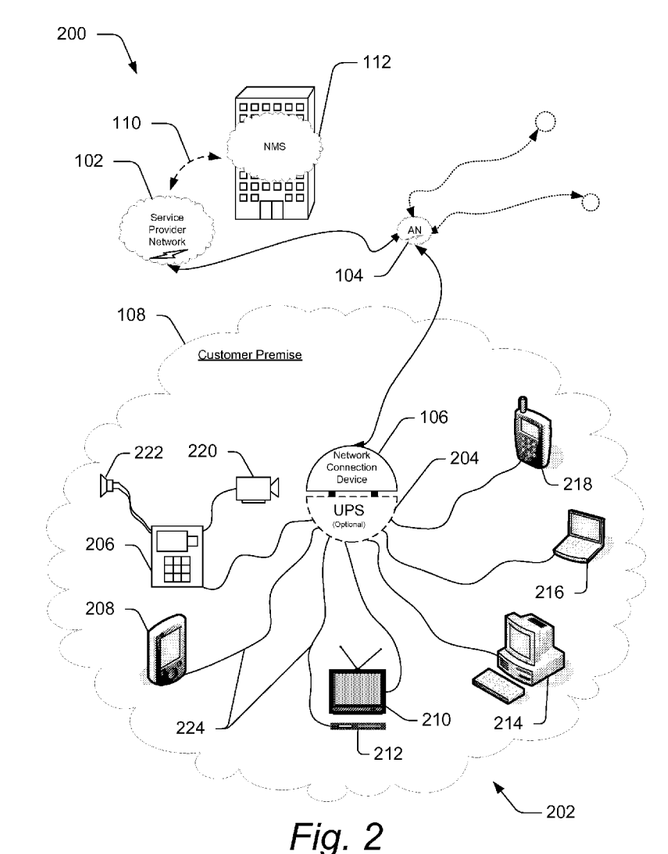
FIG. 2 is a schematic providing further details of the overall configuration of providing power over network methods and systems relating to various electronic devices in connection to a network provider.

FIG. 2 illustrates an overall environment 200 including various network enabled devices 202 in connection with the service provider network 102 via the access node 104. In some embodiments, the network enabled devices 202 may be in connection with an uninterrupted power supply (UPS) 204. The UPS 204 may be in connection with the electrical power supplier 116 (FIG. 1) via an electrical plug (not shown). The UPS 204 may also be in connection with the network connection device 106. In other embodiments, the network enabled devices 202 may be directly connected to the network connection device 106. The network connection device 106 may be a modem, receiver, or any other device that is connected to a network, such as the service provider network 102 through the access node 104. For example, the UPS 204 may provide initial power to the network enabled devices 202 when a power outage occurs, followed by power over network electrical power when the UPS 204 terminates, therefore providing approximately uninterrupted electrical power to the network enabled devices 202 during a power outage.

The network enabled devices 202 may include any number of different devices such as security alarms 206, personal data devices 208, televisions 210, video systems 212, desktop computers 214, mobile computers 216, telephones 218, and any other devices that may be connected to a network. Additionally, some devices may be connected to the network connection device 106 which are not network enabled devices 202. For example, the television 210, a video camera 220, or an audio system 222 may not be network enabled, but may still be in connection with the network connection device 106 and thus may receive electrical power from the network connection device 106.

The network enabled devices 202 may be connected to either the UPS 204 or the network connection device 106 by a network cable 224, such as an Ethernet cable or any other networking cable which has the capability to transmit computer and informational network data and supply electrical power to the network enabled devices 202. Additionally, standard electrical cables (not shown) may be used to connect non-network enabled devices to either the UPS 204 or the network connection device 106, such as by an electrical plug.

Figure 3:
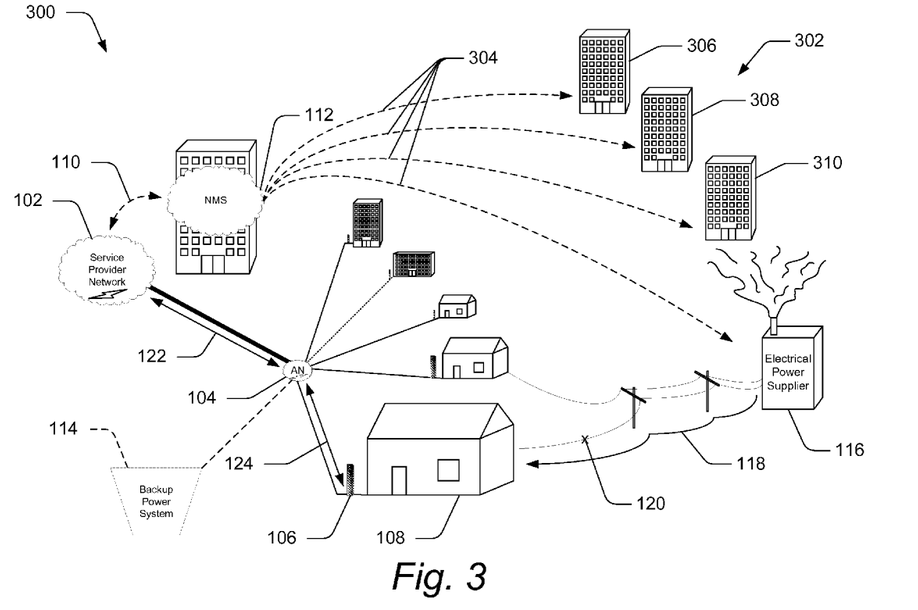
FIG. 3 is a schematic providing further details of another configuration of the overall environment shown in FIG. 1, relating to how a power over network methods and systems may be organized.

FIG. 3 illustrates an overall environment 300 including entities 302 in communication with the NMS 112 via a communication link 304. The communication link 304 may be a wired, Wi-Fi, voice, or other networking connection, or via any other communication link including both manual and system based communication means. Moreover, the communication link 304 may be any combination thereof. The entities 302 may include local authorities 306 such as the police and fire departments, security companies 308, a national security agency (NSA) 310, or other entities that may benefit by information regarding the customer premise 108 that has been disconnected from power by its primary power supplier, such as the electrical power supplier 116. Additionally, the NMS 112 may be in connection with the electrical power supplier 116 via the communication link 304. Therefore, when the primary source of electrical power is disconnected between the customer premise 108 and the electrical power supplier 116, a notification message and data may be sent to any of the entities 302 or the electrical power supplier 116. Further, the communication link 304 between the NMS 112, the entities 302, and the electrical power supplier 116 may be multidirectional.

An example communication sequence resulting from a power outage will now be presented for exemplary purposes in accordance with some configurations of the power over network methods and systems. In the environment 300 shown in FIG. 3, the customer premise 108 may include the network enabled device 202 (FIG. 2), such as the security system 206, in connection with both the electrical power supplier 116 and the service provider network 102, via the access node 104 and the network connection device 106. A power outage inducing event may occur which disconnects the power supply between the electrical power supplier 116 and the customer premise 108 at the disconnection point 120, such as a tree falling on a power line and breaking it. The security system 206 (FIG. 2) or other suitable component, typically a component located at the customer premise 108, may detect the termination of power from the supplier 116 and may switch from the electrical power supplier 116 to the network connection device 106 for electrical power. According to further embodiments, the network connection device 106 detects interruption of primary power from the supplier 116 to the customer premise 108 and, in response, provides power to the customer premise. After the security system 206 or other suitable component switches to the network connection device 106 as a power supply, a message (not shown) may be transmitted along communication links 124, 122, 110 to the NMS 112 to indicate that the customer premise 108 has experienced a power outage. This message may be forwarded by the NMS 112 to other entities 302 such as the local authorities 306, the security company 308, the NSA 310, and the electrical power supplier 116.

Generally, any of the functions described herein can be implemented using software, firmware (e.g., fixed logic circuitry), hardware, manual processing, or any combination of these implementations. The terms "module," "functionality," and "logic" generally represent software, firmware, hardware, or any combination thereof. In the case of a software implementation, the module, functionality, or logic represents program code that performs specified tasks when executed on processor(s) (e.g., any of microprocessors, controllers, and the like). The program code can be stored in one or more computer readable memory devices. Further, the features and aspects described herein are platform-independent such that the techniques may be implemented on a variety of commercial computing platforms having a variety of processors.

Methods and systems for providing electrical power in accordance with the teachings of the present disclosure may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 4:
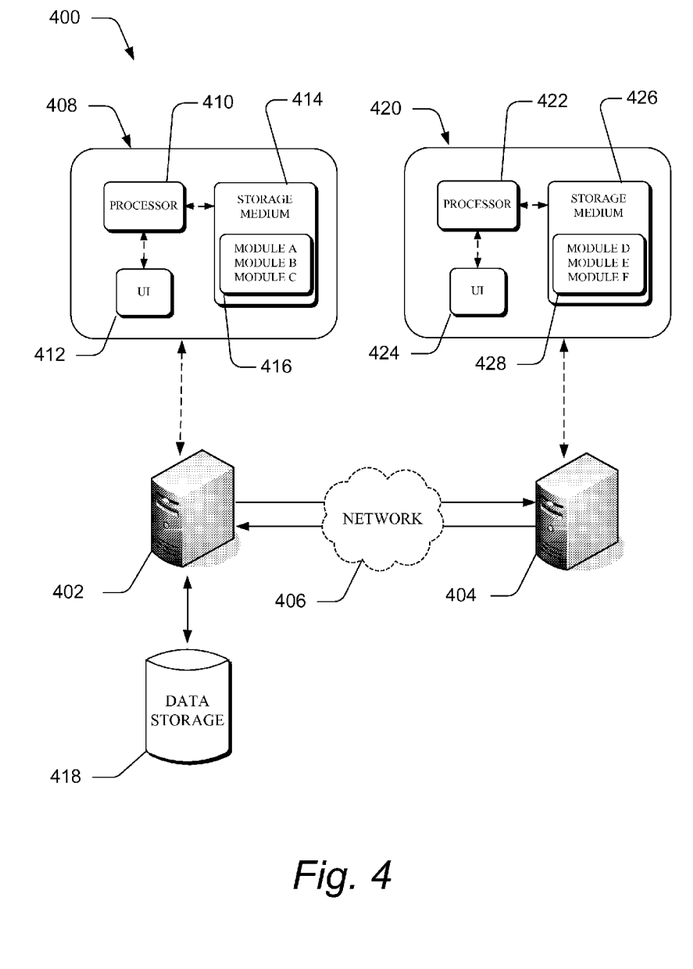
FIG. 4 is a block diagram of an overall environment in which computing devices interact between each other and how a power over network system may be organized.

FIG. 4 illustrates an overall environment 400 in which computing devices interact to pass information from a first entity to a second entity. A first computing device 402 may interact with a second computing device 404 in connection by a network 406. The computing devices 402, 404 may be a server; a desktop; a mobile, handheld, or laptop computer; a mobile telephone; a personal digital assistant (PDA), a multi-function device; or any other suitable computer-based device. The computing devices 402, 404 may be connected by any type of wired or wireless network 406, including a local or wide area network. FIG. 4 depicts two computing devices 402, 404 for convenience only, but it is noted that the environment 400 may support any number of computing devices 402, 404 in connection by one or more networks 406.

The first computing device 402 may include a number of components 408. These components 408 may include one or more processors 410 that are coupled to instances of a user interface (UI) 412. The UT 412 represents any devices and related drivers that enable the computing device 402 to receive input from a user or other system, and to provide output to the user or other system. Thus, to receive inputs, the UT 412 may include keyboards or keypads, mouse devices, touch screens, microphones, speech recognition packages, imaging systems, or the like. Similarly, to provide outputs, the UT 412 may include speakers, display screens, printing mechanisms, or the like.

The computing device 402 may include one or more instances of a computer-readable storage medium 414 that are addressable by the processor 410. As such, the processor 410 may read data or executable instructions from, or store data to, the storage medium 414. The storage medium 414 may contain a number of modules 416, such as modules A, B, C, which may be implemented as one or more software modules that, when loaded into the processor 410 and executed, cause the computing device 402 to perform any of the functions described herein, such as to perform power over network methods and systems in accordance with embodiments of the present disclosure. Additionally, the storage medium 414 may contain implementations of any of the various software modules described herein.

In some embodiments, the first computing device 402 is connected to the NMS 112 and collects and processes data from activities occurring on the service provider network 102 (FIG. 2). As shown in FIG. 4, the first computing device 402 may include (or be coupled to) a data storage device 418. For example, the data storage device 418 may archive activities and data, or a portion of the activities and data, from the service provider network 102 for use by the NMS 112. While FIG. 4 shows one data storage device 418 for convenience, the environment 400 may support any number of data storage devices 418.

As previously described, the second computing device 404 is in communication with the first computing device 402 through the network 406. The second computing device 404 may include a number of components 420. The second computing device 404 may include one or more processors 422 that are coupled to instances of a user interface (UI) 424. The UI 424 represents any devices and related drivers that enable the second computing device 404 to receive inputs from a user or other system, and to provide outputs to the user or other system. The second computing device 404 may include one or more instances of a computer-readable storage medium 426 that are addressable by the processor 422. As such, the processor 422 may read data or executable instructions from, or store data to, the storage medium 426. The storage medium 426 may contain a number of modules 428, such as modules X, Y, Z, which may be implemented as one or more software modules that, when loaded into the processor 422 and executed, cause the second computing device 404 to perform any of the functions described herein, such as perform power over network methods and systems. Additionally, the storage medium 426 may contain implementations of any of the various software modules described herein.

In some embodiments, the second computing device 404 is connected to one of the entities 302 in communication with the NMS 112. The second computing device 404 may receive data from the first computing device related to activities occurring on the network, such as a power outage at a customer premise 108. In other embodiments, the second computing device 404 may be connected to the service provider network 102 and provide the first computing device 402 with data relating to the activities, status, and other relevant data occurring on the service provider network 102.

Figure 5:
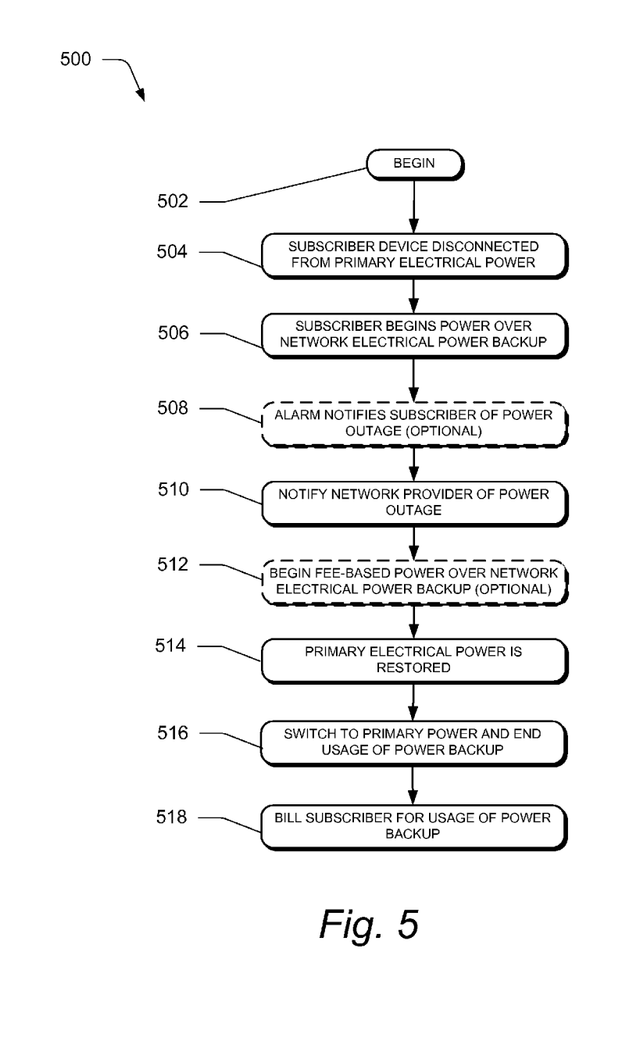
FIG. 5 is a flow diagram of methods or systems of providing power over network.

Having presented the above overview of the environment 400, the discussion now turns to a description of further details of the overall environment 400. More specifically, FIG. 5 illustrates a flow diagram 500 of methods or systems of providing electrical power over a network. At block 502, the flow diagram begins. At block 504, a subscriber device is disconnected from its primary electrical power source. For example, the network enabled device 202 may be disconnected from the electrical power supplier 116 because a power line is broken. At block 506, the subscriber device may automatically begin a power over network electrical power backup. In further embodiments, a user may given the option to receive power over a network. In some embodiments, the power over network electrical power backup may be provided by the service provider network 102 or access node 104. At block 508, an alarm may notify the subscriber of the power outage, such as by providing an audible signal to the subscriber that the primary power source has been disconnected. At block 510, the NMS 112 may be notified of the power outage. The NMS 112 may be notified of the power outage by a message sent from the network connection device 106, for example, when the network connection device 106 begins supplying electrical power to any network enabled devices 202, or other electrical devices, which are connected to the network connection device 106.

In some embodiments, at block 512, the subscriber may begin a power over network electrical power backup service. In some embodiments, the backup service may be fee-based, non-fee-based, or a combination of both. For example, in some embodiments, the backup service may initially be free of charge to the subscriber, but after a predetermined elapse of time or power consumption, the free power over network electrical power backup service at block 506 may expire. Subscribers may elect in advance or in the moment to pay subscription fees, or may make other agreements to have continued backup power supplied to the customer when a power outage occurs. For example, a subscriber may pay by the minute for the use of the power over network electrical power backup service. In other embodiments, the subscriber may switch from a free power backup to a fee-based power backup after a predetermined amount of electrical power is consumed by the subscriber.

At block 514, the primary electrical power is restored, thus ending the power outage. For example, the power disconnect 120 may be repaired by electrical workers, thus restoring electrical power from the electrical power supplier 116 to the customer premise 108 and ultimately the network enabled devices 202. The network enabled devices 202, or other devices drawing electrical power from the network connection device 106, may then automatically switch back to the primary power source at block 516. Therefore, the network communication device 106 may stop supplying electrical power to network enabled devices 202 at block 516. At block 518, the power over network backup services (fee-based or otherwise) may be concluded, and fees may be calculated, such as by the first computing device 402, and billed to the subscriber if fee-based services are implemented in flow diagram 500.

Figure 6:
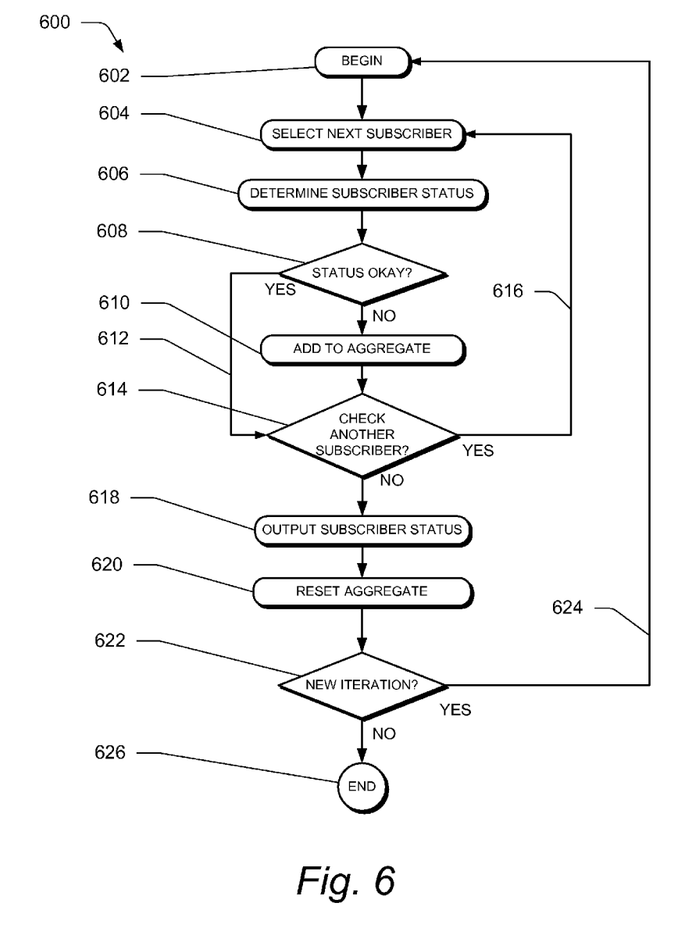
FIG. 6 is a flow diagram of additional methods or systems of providing power over network.

FIG. 6 illustrates a flow diagram 600 of other methods or systems of providing power over network. At block 602, the flow diagram begins. A block 604, the process selects a subscriber. For example, the next subscriber may be the customer premise 108 in connection to the service provider network 102. At block 606, the status of the subscriber is determined. The status determination may query whether the subscriber has primary electrical power, such as that supplied by the electrical power supplier 116. For example, the network connection device 106 may determine a power outage has occurred, and next may communicate a power outage message to the NMS 112.

At decision block 608, the status is reported by the subscriber, such as by a message indicating whether the subscriber has primary electrical power. If the subscriber does not have power, then the subscriber is added to an aggregate at block 610. The aggregate may be data stored at a computer device, such as the computer device 402. The data may be processed, such as by the processor 410 or stored, such as in the storage device 418 or in the storage medium 414. If the subscriber has power at decision block 608, then route 612 diverts the process to block 614. For example, if a customer accidentally disables the primary power for their customer premise 108, such as by blowing a fuse, then the aggregate for an access node may only include that single customer premise because the other customer premises 108 would not be disconnected from electrical power. However, if a power line is broken, many customer premises may be disconnected from electrical power and the aggregate may compile information on each disconnected customer premise 108.

At decision block 614, the process checks to see if another subscriber exists. If another subscriber exists, the process is diverted 616 to block 604 to obtain information on this additional subscriber. If no more subscribers are present, then at block 618, the subscriber status data is outputted. For example, the aggregate subscriber data relating to power outages may be outputted from the first computing device 402 utilized by the NMS 112 over the network connection 406 to the second computing device 404 utilized by the entity 302 or the electrical power supplier 116. In some embodiments, a report may be automatically generated to determine which of the customer premises 108 are experiencing a power outage, and the report may be transmitted to the appropriate entity 302 which may benefit from such information. Further, the entities 302 may subscribe to data delivery services such as those described above. Therefore, the first computing device 402 may record outputs of data, reports, or information relating to subscribers, such as by storing data in the storage medium 414 or the data storage 418, and bill any of the entities 302 or the electrical power suppliers 116 who are provided the data, reports, or information.

At block 620, the aggregate may be reset. For example, when all of the subscribers for a region have been checked, the aggregate information may be stored and then reset to allow for another iteration of status checks of all the subscribers in a region, or portion thereof. At decision block 622, the process determines if a new iteration should be initiated. If a new iteration is requested, the process is diverted 624 to block 602 to initiate the iteration. If a new iteration is not requested, the process ends a block 626.

It is noted that the various modules shown herein may be implemented in hardware, software, or any combination thereof. Additionally, these modules are shown as separate items only for convenience of reference and description, and these representations do not limit possible implementations of the teachings herein. Instead, various functions described with these modules could be combined or separated as appropriate in a given implementation, without departing from the scope and spirit of the description herein.

Although techniques for providing power over network methods and systems have been described in language specific to certain features and methods, it is to be understood that the features defined in the appended claims are not necessarily limited to the specific features and methods described. Rather, the specific features and methods are disclosed as illustrative forms of implementing the claimed subject matter.

What is claimed is:

1. A system for providing electrical power over a network comprising:
   a service provider network module configured to facilitate digital communications and having an autonomous power supply;
   a network connection device operably connected to the service provider network module, the network connection device including at least one network connection port configured to receive electrical power from the service provider network module; and
   a power switching module coupled to the at least one network connection port and configured to switch from a primary power source to enable the network connection device to receive electrical power from the service provider network module via the at least one network connection port when electrical power from the primary power source is interrupted, wherein the primary power source provides electrical power to a plurality of customer premises and utilizes a different power grid than the service provider network module.

2. The system of claim 1, wherein the power switching module further includes:
   a sensing component configured to determine if a primary power source is interrupted; and
   an automatic switching module configured to switch the network connection device from receiving a first electrical power to receiving a second electrical power when the primary power source is interrupted.

3. The system of claim 1, wherein the at least one network connection port provides an Ethernet network connection.

4. The system of claim 1, further comprising a computer readable medium configured to record a power consumption distributed by the at least one network connection port.

5. The system of claim 1, further comprising a transmitting module for communicating the network connection device location and power status through the service provider network module.

6. The system of claim 1, wherein the network connection device includes a UPS redundancy module.

7. The system of claim 1, wherein the at least one network connection port includes at least one of a network interface and an electrical power interface.

8. The system of claim 7, wherein the electrical power interface includes a socket to accept an AC electric plug.

9. The system of claim 1, wherein the autonomous power supply includes at least one of:
- a backup battery;
- a generator;
- a connection to an electric power supplier other than the primary power source; and
- a connection to a network service provider with auxiliary electrical power.

10. A method of providing power over a data network to a subscriber comprising:
- monitoring primary electrical power provided by a primary power source to a network device associated with the data network, wherein the primary power source provides electrical power to a plurality of customer premises and utilizes a different power grid than the data network;
- when an interruption of the primary electrical power is detected, providing secondary electrical power via the data network to the network device;
- when a reconnection of the primary power source is detected, decoupling the secondary electrical power from the network device; and
- restoring the primary electrical power from the primary power source to the network device.

11. The method of claim 10, wherein the data network is configured to facilitate bidirectional digital communications with the network device via a network access point, and wherein the secondary electrical power is provided by a secondary power source coupled to the data network and positioned remotely from the network access point.

12. The method of claim 10, wherein switching to a secondary electrical power includes initiating a power meter reading, and wherein decoupling the secondary electrical power includes terminating a power meter reading.

13. The method of claim 12, wherein the power reading measures one of the time of secondary power usage and the wattage of secondary power usage.

14. The method of claim 10, wherein the secondary electrical power is supplied by a network backup power supply.

15. The method of claim 10, wherein switching to a secondary electrical power occurs automatically when an interruption of the primary electrical power is detected.

16. The method of claim 10, further comprising determining whether the subscriber has subscribed to the power over a network service, the service including switching to the secondary power source when the interruption is detected.

17. The method of claim 10, wherein sensing an interruption includes recording a power interruption data in a computer readable media.

* * * * *